Figure 1:
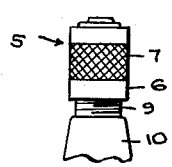

Sept. 29, 1959  M. L. SHANNON  2,906,282
PNEUMATIC TIRE LEAKAGE INDICATOR
Filed Oct. 9, 1957

INVENTOR.
MERRILL L. SHANNON,
BY
ATTORNEY

United States Patent Office 2,906,282
Patented Sept. 29, 1959

2,906,282

PNEUMATIC TIRE LEAKAGE INDICATOR

Merrill L. Shannon, Miami, Fla.

Application October 9, 1957, Serial No. 689,125

5 Claims. (Cl. 137—228)

This invention relates to a vehicle tire signal device for indicating leakage from the tire through the conventional tire valve and valve stem and contemplates a signal device that is substituted for the conventional tire valve cap and whereby to provide a visual signal to indicate the presence of any relatively slow leakage from the valve.

The invention further contemplates a valve cap for pneumatic tires that is provided with piston mechanism in combination with a shuttle piston and with the piston and shuttle being normally biased to a position that indicates normal valve conditions and with the piston and the shuttle being additionally actuated to project above the cap to indicate the visual red band, indicating to the driver of the vehicle that there is a leakage in the tire valve and with the piston and the shuttle when shifted to signal position substantially sealing the device against the escape of air from the tire.

A further object of the invention is to provide a valve cap having a pressure operated piston and an associated piston shuttle and with the shuttle having an indicating head portion that is provided with a circumferential band of color to indicate a leaking condition of the valve and with the shuttle being additionally axially ported and provided at its upper end with a spring seated valve and whereby a conventional air hose may be engaged therewith to feed air downwardly and pass the valve core for inflating the tire and with the shuttle being additionally depressed when engaged by the air hose, to engage the upper end of the valve core and to unseat the valve core to permit the ready flow of air to the tire and with the shuttle being biased in a direction whereby, when the air hose is removed, the shuttle will be shifted upwardly to a normal sealing engagement with the piston and to simultaneously release the valve core to its fully seated position.

Novel features of construction and operation of the device will be more clearly apparent during the course of the following description, reference being had to the accompanying drawings wherein has been illustrated the preferred form of the device and wherein like characters of reference are employed to denote like parts throughout the several figures.

Figure 2:
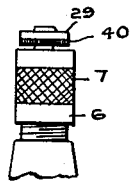
Figure 3:
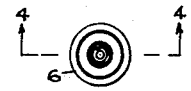
Figure 4:
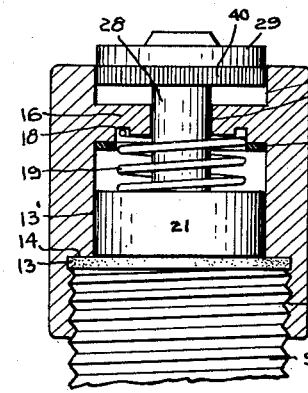
Figure 5:
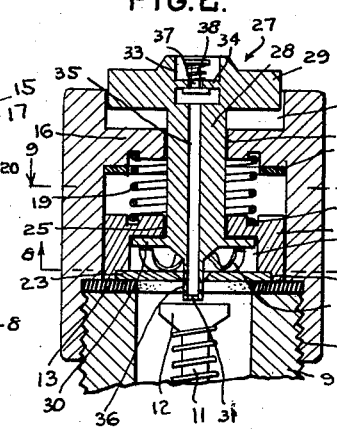
Figure 6:
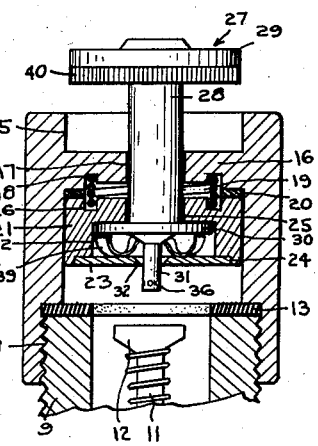
Figure 7:
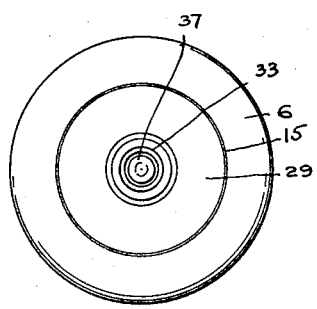
Figure 8:
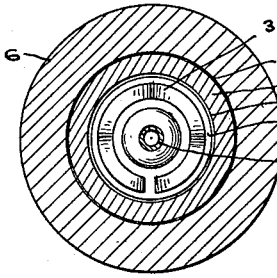
Figure 9:
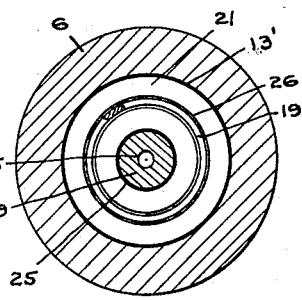

In the drawings, wherein has been illustrated a preferred form of the device:

Figure 1 is a side elevation of a valve cap constructed in accordance with the invention, Figure 2 is a similar view but with the mechanism being shifted to a signal position indicating valve leakage, Figure 3 is a top plan view of the valve cap, Figure 4 is a vertical section taken substantially on line 4—4 of Figure 3, parts being shown in elevation, Figure 5 is a view similar to Figure 4, with the mechanism being entirely shown in section and with the parts being in normal operative position, Figure 6 is a view similar to Figure 4, parts being shown in elevation and with the mechanism being shifted to an elevated visual signal position, Figure 7 is an enlarged top plan view of the device, Figure 8 is a transverse section taken substantially on line 8—8 of Figure 5 and, Figure 9 is a transverse section taken substantially on line 9—9 of Figure 5.

Referring specifically to the drawings, the numeral 5 designates a valve cap as a whole, including a cylindrical body portion 6. The body portion 6 may be circumferentially knurled at 7 for convenience of operation. The body portion 6 at its lower end is cylindrically recessed and threaded at 8 for the threaded reception of the threaded end 9 of a conventional valve stem 10. The valve stem 10 carries the well known valve core mechanism 11, having the head portion 12. A sealing washer 13, of rubber or the like is seated within the upper end of the recess 8 for providing a sealed engagement between the cap 5 and the valve stem.

The body portion 6 is further cylindrically chambered at 13' and with the chamber being of smaller diameter than the recess 8, forming a shoulder 14 against which the washer 13 engages. The chamber 13' is concentric to and is fully opened into the recess 8. The body portion 6 is further cylindrically recessed at its upper end as at 15 and with the recess 15 opening upon the top of the valve cap. A wall portion 16 separates the chamber 13' and the recess 15 and, as shown, the recess 15 is concentric to the chamber 13'. The wall 16 is vertically cylindrically apertured, as at 17 to form a guide for a piston rod to be presently described. The wall 16 upon its underside is provided with an annular groove 18, forming a seat for a compression spring 19. A sealing washer 20 is fixed upon the underside of the wall 16, for a purpose to be described.

Shiftable axially of the cap 5 and within the chamber 13' is a piston 21. The piston 21 is concentrically and cylindrically chambered upwardly from its lower end, as at 22, forming a cylinder, for a purpose to be described. The lower end of the cylinder is closed by a plate 23, that has a preferably press fit within an enlarged groove 24 formed in the lower end of the piston. The piston is further cylindrically apertured at 25 and with the aperture 25 being concentric to and substantially of the same diameter as the aperture 17 of the wall 16. The upper face of the piston 21 is also circumferentially grooved at 26 for the seating reception of the spring 19 and whereby the piston is normally biased downwardly in the chamber 13 to a point where the piston 21 and the plate 23 bear against the washer 13.

Axially shiftable with respect to the valve cap and guided by the apertures 17 and 25, is a piston and piston rod, indicated as a whole by the numeral 27. The piston unit 27 embodies a cylindrical piston rod 28, having an enlarged integral cylindrical head 29. The head 29 is shiftable into and out of the recess 15 in a manner to be presently described. The piston rod 28 adjacent its lower end is provided with a circumferential flange 30, that is dimensioned to have sliding engagement within the cylinder 22 and with the upper face of the flange adapted to have a smooth normal contacting relation with the upper end of the cylinder 22 to have substantially an air tight engagement therewith. It will be apparent of course that an additional resilient gasket may be disposed upon the upper end of the cylinder 22 if found desirable. The piston rod 28 at its lower extremity is reduced in diameter to form an axially extending cylindrical leg portion 31, that passes downwardly through an aperture 32 formed in the plate 23. The head 29 is centrally and axially chambered at 33 and with the chamber being partitioned intermediate its depth as at 34. The piston 28 is axially ported at 35 and with the port communicating with the chamber 33 and the leg 31, constituting an air passage to the valve stem. The leg 31 is also ported at 36, to permit the escape of air under pressure that is directed to the valve stem. The partition 34 is axially apertured for receiving a valve stem 37, having an upper and lower enlarged ends and with the valve stem being urged upwardly by a spring 38, whereby the lower enlarged end and the valve stem has a sealing engagement against the partition 34. The piston rod 28 is biased in an upward direction by a flat circular spring 39, that jointly bears against the plate 23 and the bottom of the flange 30 and whereby the pistons 21 and 28 assume a normal contacting position with each other. When the parts are in their normal inactive position, indicating normal conditions with respect to the valve stem, the head 29 is partially engaged into the recess 15 to a depth whereby the upper end of the body 6 overlies a preferably red band 40. As also indicated in Figure 5, the piston rod 28 and its head portion 29 is additionally movable downwardly against the tension of the spring 39 when depressed by a nozzle portion of a conventional air filter hose and when so depressed, causes the leg 31 to engage the upper end of the valve core 11 to unseat the valve core and permit of a free flow of air through the valve mechanism 37, and through the port 35, and outwardly through the ports 36 to the interior of the tire. The entire mechanism may be formed of any desirable material, such as metal or plastic.

Operation

In the use of the device, the conventional valve cap is removed and discarded. The valve cap 5 is then screwed upon the threaded end 9 of the tire valve stem to a point where the shoulder 14 compresses the washer 13 to a sealing engagement with the upper end of the stem. Assuming that the tire has been previously inflated to the proper pressure, the parts will assume the position illustrated in Figures 4 and 5. When a leak occurs in the valve core, the pressure builds up in the valve stem to a degree whereby the piston 21 is elevated against the tension of the spring 19 and, since the spring 39 normally positions the piston rod 28 with respect to the piston 21, the pistons will rise jointly to the point where the upper surface of the piston 21 contacts the washer 20, forming a sealed engagement therewith. In this position, the head 29 of the shuttle has been projected above the top of the valve cap, exposing its circumferential band of red color 40 and indicating visually to an attendant or other individual that the valve core is leaking. The valve cap 5 may be removed and the tire inflated in the usual and well known manner or, the tire may be inflated through the valve 38, by engaging the conventional nozzle of the air filler hose thereto. It is understood of course that the nozzle is provided with a lug that normally unseats the valve 38 in the present instance or unseats the valve core 11 when the pressure is applied directly to the stem. When the air hose is engaged with the head 29 and the valve mechanism 38, pressure downwardly is exerted thereon, forcing the piston rod 28 downwardly and carrying with it the piston 21 after first compressing the spring 39. Such movement downwardly causes the head 29 to fully engage the recess 15 and in such position, the leg 31 has been depressed and unseated the valve core 11. This method of inflation avoids the necessity of removing the valve cap, but when a leakage is indicated by the positioning of the parts as indicated in Figure 6, it will be apparent that the cap at a convenient time, will be removed and the valve core replaced in the valve stem. The tire pressure can also be readily determined by the conventional hand gauges by engaging the gauge to unseat the valve mechanism 37 and 38, such downward pressure unseating the valve 38 and also depressing the piston rod 28 to unseat the valve core. It will be clearly apparent that the device of this invention is not a tire gauge, since it has no normal connection with the valve core of the valve stem and merely provides a novel form of indicator to indicate an abnormal condition of the valve core. The air inflation means associated with the piston head 29 normally is an emergency inflation means since under conditions where the valve core is leaking, it is customary to promptly replace the core.

It will be apparent from the foregoing that a very novel form of visual indicator has been provided to indicate a condition of leakage in the valve stem. The parts are few and simple, cheap to manufacture, are strong, durable and highly effective for the purposes indicated.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A tire valve and leakage indicator assembly, comprising a cap having a cylindrical body and with the body at its lower end being recessed and threaded to the stem of said tire valve, a compressible washer disposed in the bottom of the recess sealing the cap with respect to the stem, the body being cylindrically chambered and forming upper and lower cylinders, upper and lower pistons operable in the cylinders and with the pistons having means yieldably connecting one to the other and said pistons being relatively movable axially of the cap, the upper cylinder opening upon the top of the cap and the lower cylinder opening into the recess, the upper piston being movable into and out of the upper cylinder, a compression spring in the lower cylinder that engages the lower piston and whereby to bias the piston in a direction in opposition to a flow of air escaping outwardly from the tire valve, the compressible washer also underlying the lower piston and whereby to seal the lower piston with respect to the valve stem, a compressible washer disposed in the upper end of the lower cylinder and whereby to seal the lower piston against the further escape of air from the tire valve, the pistons being simultaneously shifted upwardly under the influence of the escaping air, the upper piston being projected upwardly above the top of the cap when pressure is exerted upon the lower piston and whereby to expose a colored circumferential band on said upper piston to indicate an abnormal condition of air pressure in the tire valve and means carried by the upper piston whereby pressurized air may be directed to the tire valve without removing the cap.

2. The structure according to claim 1, wherein the yieldable connecting means embodies a piston rod on the upper piston, the lower piston being chambered and apertured for the passage of the piston rod, the piston rod having a flange that traverses the last named chamber and spring means in the last named chamber whereby to bias the flange and the piston rod to a normal contacting and sealed engagement with the top wall of the last named chamber and whereby the pistons are shiftable upwardly under influence of escaping air in unison to indicate tire valve leakage.

3. The structure according to claim 1, wherein the lower piston is provided with a downwardly opening concentric and cylindrical chamber, the chamber being closed by a fixed cover plate, the second piston including an enlarged piston head and a cylindrical piston rod, the rod being provided with a piston flange that is disposed in the chamber, a spring in the chamber that bears upon the cover plate and the underside of the flange and whereby to bias the piston rod and the upper piston to a yieldable engagement with the lower piston, the piston rod having a reduced lower end that projects downwardly through an aperture formed in the cover plate and that normally terminates adjacent to and in axial alignment with the upper end of the pin of the tire valve, the second piston being axially chambered on its top and with the piston rod and the reduced lower end being axially bored and projecting into said lower cylinder, a downwardly opening check-valve disposed in the bore of the last named chamber and with the reduced lower end being ported and whereby pressurized air can be directed to the tire valve, the upper piston and its piston rod being shiftable downwardly against the tension of the chamber spring when under the influence of pressure exerted upon the piston by an air hose for actuating the check valve and whereby to cause the reduced extension to engage the pin of the tire valve.

4. A visual signal device for indicating leakage in a tire valve, comprising a cylindrical valve cap that is recessed and threaded at its lower end, the cap being provided with a relatively long concentric and cylindrical piston chamber and an upwardly opening cylindrical and concentric recess to form an upper and relatively shallow piston chamber, a piston shiftable in the first named chamber and biased downwardly by a spring, the first named chamber being downwardly opening and communicating with the threaded recess, means limiting the downward movement of the first piston, a piston shiftable in the second named chamber and having a piston rod that has a yieldable connection with the first piston and whereby the pistons are normally movable together under the influence of air pressure in said threaded recess, the second piston being normally partially engaged in the second cylinder and its rod being shiftable downwardly against the yieldable means separately from said first portion, the second piston having a circumferential colored band that is normally disposed within the second cylinder, whereby when the pistons are jointly shifted upward under the influence of air pressure in said threaded recess the upper piston will be projected above the top of the cap to expose the colored band and means associated with the second piston for introducing air under pressure into said recess.

5. A tire valve and leakage indicator assembly that embodies a cap that has threaded and sealed engagement with the threaded end of the tire valve stem, the cap comprising a cylindrical body having upper and lower piston chambers formed therein, a partition disposed between the chambers and with the partition being axially and cylindrically apertured, upper and lower pistons operable in the chambers, a cylindrical connecting rod carried by the upper piston and that extends downwardly through the aperture and having a yieldable connection with the lower piston, the lower piston being subjected to air escaping outwardly from the tire valve and whereby the lower piston is shifted in its chamber, spring means biasing the lower piston in opposition to the pressure of the escaping air, the upper piston and its connecting rod being shifted upwardly under the influence of the movement of the lower piston and whereby the upper piston will project above the top of the cap and visual means carried by the upper piston that is exposed when the piston is projected upwardly, means limiting the downward movement of the lower piston, the said yieldable connection providing means such that the upper piston and its connecting rod may be forced downwardly to depress the pin of the tire valve stem when an air supply hose is engaged therewith.

References Cited in the file of this patent

UNITED STATES PATENTS

| | | |
|---|---|---|
| 1,346,961 | Jackson | July 20, 1920 |
| 1,807,752 | Poster | June 2, 1931 |